Jan. 31, 1939.  P. D. MOTTA  2,145,428

DOUGH MIXING AND WORKING MACHINE

Filed Feb. 2, 1938  3 Sheets-Sheet 1

Inventor

PETER D. MOTTA,

By

Attorney

Jan. 31, 1939.   P. D. MOTTA   2,145,428
DOUGH MIXING AND WORKING MACHINE
Filed Feb. 2, 1938   3 Sheets-Sheet 2
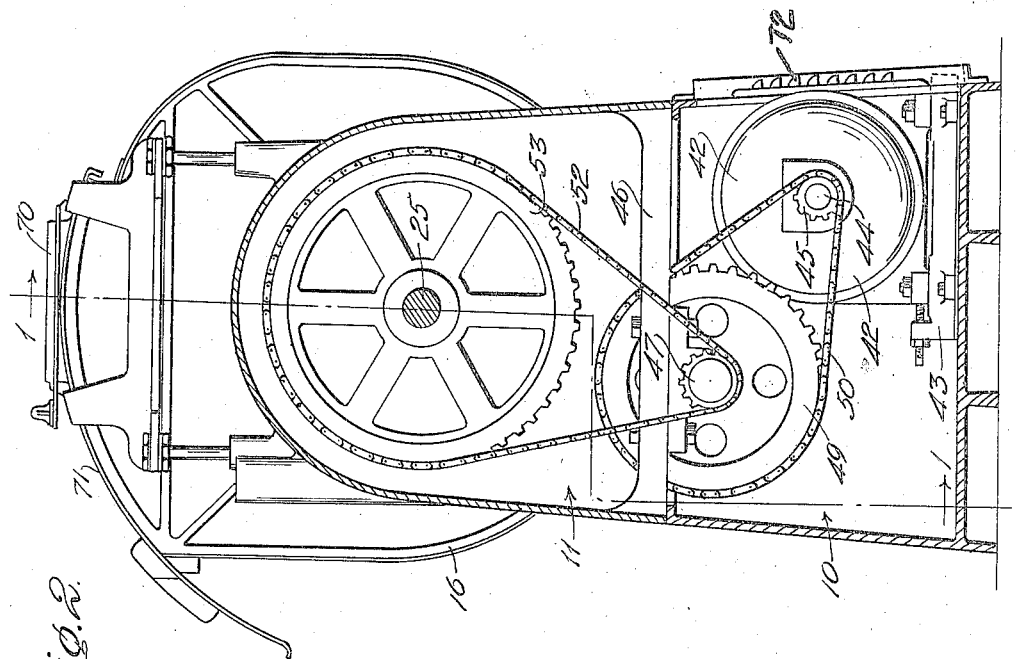
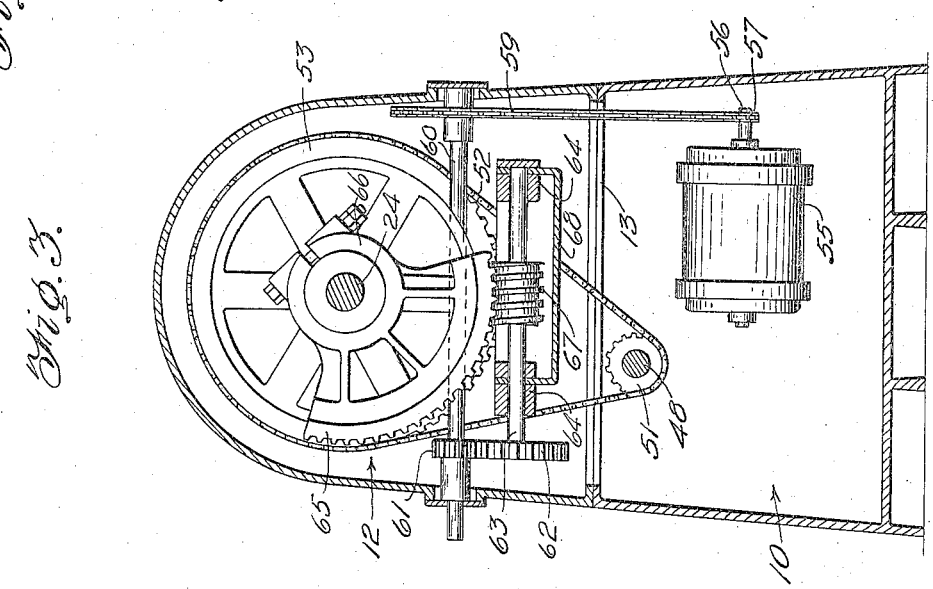
Inventor
PETER D. MOTTA,
By
Attorney Inventor
PETER D. MOTTA, Patented Jan. 31, 1939

2,145,428

UNITED STATES PATENT OFFICE 2,145,428

DOUGH MIXING AND WORKING MACHINE

Peter D. Motta, Joliet, Ill., assignor to Champion Machinery Company, Joliet, Ill.

Application February 2, 1938, Serial No. 188,389

3 Claims. (Cl. 259—110)

This invention relates to dough mixing and working machines.

One important object of the present invention is to provide an improved machine of this general character wherein the improved mixing agitator formed by the spiders and rods is supported by a pair of stub shafts so that there is not only no central shaft between the spiders but also the spiders are provided with free rolling rollers which work in conjunction with an equal number of bent deflecting bars, located immediately ahead of the rollers. Thus, this mixing agitator, which is preferably to be known as the super roller bowl cleaning type, acts in the following manner. During the mixing operation and the method obtained by the three free end bearing rollers and the deflecting bars, as the dough is dumped from the machine the bowl is actually cleaned by the dough itself. In other words with mixers not equipped with this super agitator, and with a center shaft, when the bowl is tilted half of the dough will come out, but the other half will be wound around the mixing agitator and will have to be removed by hand.

When the central shaft ordinarily used is eliminated and the mixing agitator structure is supported on the stub shafts the problem is presented of avoiding distortion of the mixing agitator structure since, in the usual form of machine the central shaft resists this distortion and can be driven from one end.

A second important object of the present invention is to provide a novel driving mechanism for machines of this character wherein the driving mechanism is connected to the stub shafts of the mixing agitator in such manner that the stub shafts are driven in unison.

A third important object of the present invention is to provide a novel arrangement of bowl tilting mechanism which is so arranged as to be operable without interfering with the mixing agitator driving mechanism.

A fourth important object of the invention is to provide an improved dough mixer wherein, in connection with the relation of the rollers from the axis of the mixing agitator at the front, back and bottom of the bowl sheet, the spacing of the bars and rollers and their size together with the peculiar shape of the bowl there is a curvature obtained which permits the dough, during the mixing action, to more or less release and thus to obtain efficient stretching and kneading effect.

A fifth important object of the invention is to provide an improved mixing agitator without a center shaft so that no raw ingredients can adhere to such a shaft and there is a more thorough incorporation of all ingredients going into the dough.

With the above and other objects in view as will hereinafter be apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 2 is a section on the line 2—2 of Figure 1 with certain parts omitted.

Figure 3 is a similar section on the line 3—3 of Figure 1.

Figure 1:
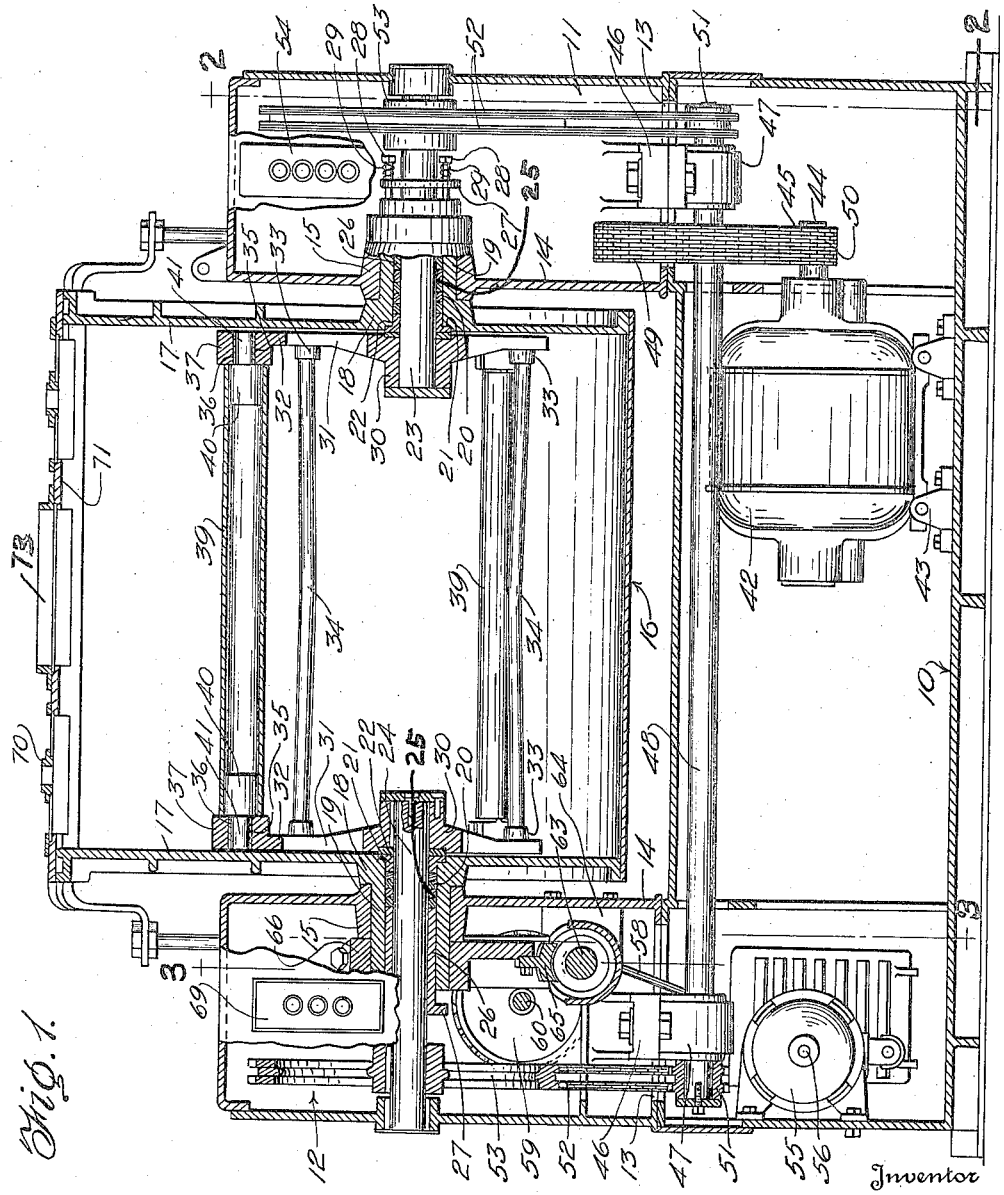
Figure 1 is a transverse section through the improved dough mixer, the section being taken substantially on the line 1—1 of Figure 2, certain of the elements cut by the section plane being shown in elevation.
Figure 4:
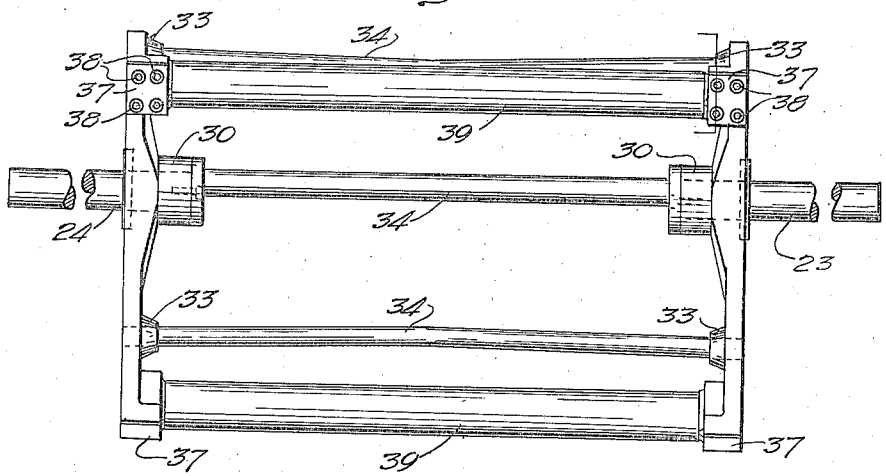
Figure 4 is a side elevation of the improved mixing agitator structure shown as removed from the remainder of the machine.

In the accompanying drawings one preferred embodiment of the invention is illustrated in its essential elements but with certain minor details such as bolts, nuts and other minor parts present in the actual machine omitted because of the necessarily small scale in which the present drawings are made. It is therefore to be understood that proper means are employed for holding parts of the machine in proper relation to each other, suitable anti-friction bearings are used where desired or necessary and other features may be added without altering the essential features shown in these drawings and now to be particularly described.

In the construction here shown there is provided a frame or support including a transversely disposed hollow base or casing indicated in general at 10. From each end of the casing 10 rises a hollow leg or leg casing, one of these casings being shown at 11 and the other at 12. These casings communicate with each other through suitable openings and are shown at 13. The legs 11 and 12 form the supports for the bowl and mixing agitator. Each of the legs 11 and 12 has an inner side wall 14 whereon is formed a cylindrical bearing 15, these bearings being axially aligned. A mixing bowl 16 is positioned between the legs 11 and 12 and has side walls 17 provided each with a hollow boss 18 extending from which is a hollow journal 19 revolubly mounted in a respective bearing 15. An abrupt shoulder is formed between each journal and boss so that these shoulders serve to prevent lateral movement of the bowl by their engagement with the proximal ends of the bearings 15. The bore 20 of each boss and journal has an annular rabbet and in this end of each bore is fitted an abutment ring 22. Through each abutment ring extends a stub shaft, the shafts at the legs 11 and 12 being indicated respectively at 23 and 24. Within the bores 20 and surrounding the shafts 23 and 24 are series of packing rings 25. Extending into the outer end of each journal 19 is a packing gland or sleeve 26 having at its outer end a flange 27. Through each flange extend bolts 28 which are screwed in the outer ends of the journals 19 and springs 29 surround the bolts between their heads and the flanges 27 so that the gland is constantly urged in by the springs to compress the packing rings 26 against the abutment ring 22. This arrangement ensures the proper sealing of the mixing bowl at these points so that none of the contents of the bowl can escape along the shafts 24 and 25.

Keyed on the inner end of each shaft is a three armed spider. Each of these spiders has a central hub 30 from which radiate the inner portions 31 of three arms arranged at 120° from each other. Each arm has an outer end portion 32 arranged at an obtuse angle to the inner portion, the obtuse angles all being equal and the outer ends all being inclined in the same general direction. The angle portions of the arms are provided with bosses 33 wherein are mounted the ends of bent deflector bars 34 having their central portions bent inwardly slightly as shown in Figure 1. The end face of each arm portion 32 is provided with a bearing groove 35 wherein is mounted a bushing 36 of bronze or other antifriction metal. Each bushing 36 is held in place by a bearing cap 37 secured on the arm portion 32 by bolts 38. Tubular rollers 39 are closed at their ends by closure plugs 40 from which extend journals 41 which fit in the bushings 36 so that the rollers are freely revoluble.

A motor 42 is adjustably mounted on a base 43 in the base casing 10 and is provided with a shaft 44 whereon is keyed a driving sprocket 45. Extending across the openings 13 from the front to the back walls of the legs 11 and 12 are bars 46 beneath each of which is secured a bearing assembly 47 preferably of the anti-friction type. The bearings 47 are aligned and support a jack shaft 48. On the shaft 48 is fixed a sprocket 49 which is driven from the sprocket 45 by a chain 50 preferably of the silent chain type as shown. On each end of the shaft 48 is fixed a double sprocket 51 which is connected by chains 52 with a double sprocket 53 fixed on a respective stub shaft 23 or 24. A control switch assembly 54 is wired to the motor by wiring, not shown, and controls the operation of said motor. It will now be seen that the motor drives the shaft 48 and this in turn drives the shafts 23 and 24 in unison so that there is no tendency for the agitator assembly to become distorted.

In the base casing 10 is a second motor 55 having a shaft 56 whereon is fixed a sprocket 57 which is connected by a chain 58 with a sprocket 59 fixed on a shaft 60. A pinion 61 is fixed on the shaft 60 and meshes with a gear 62 fixed on a worm shaft 63 journalled in bearings 64. A rocker segment 65 is provided with a split hub 66 which is clamped on the outer end of the journal end 19 in the casing 12. This segment is aligned above the shaft 63 which carries a worm 67 meshing with the segment and working in a grease pan 68. The motor 55 is controlled from the switch assembly.

By the operation of this motor the shaft 60 is driven and this drives the shaft 63 which, in turn, actuates the segment 65 to move the bowl 16 between loading and dumping positions.

The bowl is provided with the usual loading or ingredient openings or doors 70 carried by a bowl cover 71. A hinged safety cover 73 is carried by the bowl cover 71. This cover 73 forms a means of protecting an operator since, if one lays his hand on the edge of the bowl during its movement to upright position the element 73 will push the hand away. Suitable ventilating means, such as the louvers 72 are provided for cooling the interior of the casings 10, 11 and 12.

Figure 5:
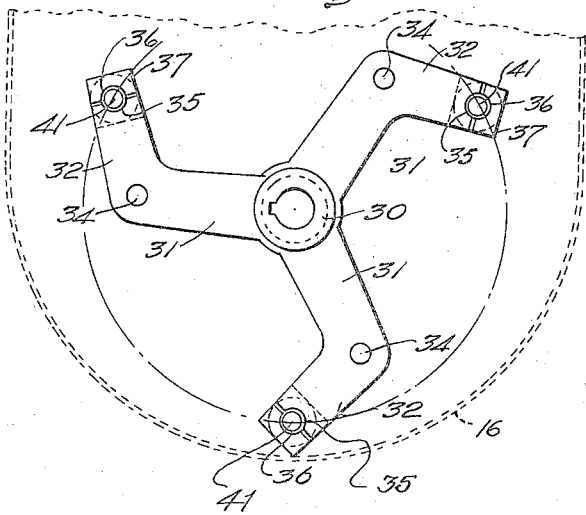
Figure 5 is an end view of the mixing agitator structure.
Figure 6:
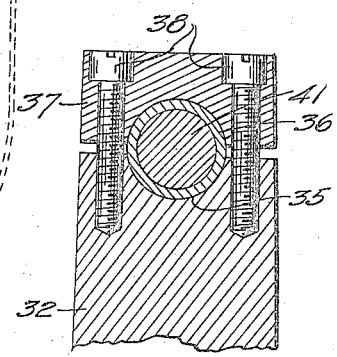
Figure 6 is an enlarged detail section on the line 6—6 of Figure 4.

It will be observed, as indicated in Figure 5, that there is a greater clearance between the rollers and the bowl, both back and front, on the horizontal plane of the axis of the agitator, than there is between the rollers and the bottom of the bowl. For instance, the clearance above may be three and seven-eighths inches at each side of the axis and one and one-half inches from the bottom. These dimensions are merely typical of suitable dimensions.

In manufacturing these machines they will be made in several sizes as, for instance, having capacities of 200, 300, 400 pounds, and even larger. For smaller machines, such as 200 and 300 pound capacity, a single drive chain will be used in place of the double chain drive here shown which is suitable for machines of 400 pound capacity. For larger machines a drive consisting of three or even more chains may be used.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a dough mixer having a frame provided with a pair of spaced walls having aligned bearing bosses, a bowl between said walls and having end walls provided with tubular combined hollow journal members and stuffing boxes, a mixing agitator in said bowl and having fixedly spaced ends, aligned shafts extending outwardly from the agitator ends through said journal members in spaced concentric relation therewith to provide annular spaces between the shafts and the inner surfaces of the journal members, packing in said spaces and held against movement inwardly by said ends, packing glands extending into the outer ends of said spaces and fitting on the outer portions of said shafts, a segmental member having a split hub revolubly mounted on one of said journal members, means for clamping said hub in adjusted position on its journal member, a worm gear segment carried by said segmental member, a worm meshing therewith whereby actuation of the worm will rock the bowl, and means for actuating said shafts and for independently actuating said worm.

2. In a dough mixer having a frame provided with a pair of spaced walls having aligned bearing bosses, a bowl between said walls and having end walls provided with tubular combined hollow journal members and stuffing boxes, a mixing agitator in said bowl and having fixedly spaced ends, aligned shafts extending outwardly from the agitator ends through said journal members in spaced concentric relation therewith to provide annular spaces between the shafts and the inner surfaces of the journal members, packing in said spaces and held against movement inwardly by said ends, abutment rings interposed between the inner extremities of the packings and said agitator ends, packing glands extending into the outer ends of said spacers and fitting on the outer portions of said shafts, a segmental member having a split hub revolubly mounted on one of said journal members, means for clamping said hub in adjusted position on its journal member, a worm gear segment carried by said segmental member, a worm meshing therewith whereby actuation of the worm will rock the bowl, and means for actuating said shafts and for independently actuating said worm.

3. In a dough mixer having a frame provided with a pair of spaced walls having aligned bearing bosses, a bowl between said walls and having end walls provided with tubular combined hollow journal members and stuffing boxes, a mixing agitator in said bowl and having fixedly spaced ends, aligned shafts extending outwardly from the agitator ends through said journal members in spaced concentric relation therewith to provide annular spaces between the shafts and the inner surfaces of the journal members, packing in said spaces and held against movement inwardly by said ends, said journal members being rabbeted internally at their inner ends, abutment rings fitting in said rabbets and spacing the spaces between the shafts and said journal members, said rings being disposed on the shafts between the packings and the agitator ends, packing glands extending into the outer ends of said spaces and fitting on the outer portions of said shafts, a segmental member having a split hub revolubly mounted on one of said journal members, means for clamping said hub in adjusted position on its journal member, a worm gear segment carried by said segmental member, a worm meshing therewith whereby actuation of the worm will rock the bowl, and means for actuating said shafts and for independently actuating said worm.

PETER D. MOTTA.